(12) United States Patent  (10) Patent No.: US 8,082,645 B2
Levins, II et al.  (45) Date of Patent: Dec. 27, 2011

(54) ROTARY MANUAL RELEASE

(75) Inventors: Michael E. Levins, II, Moore, SC (US);
 Benjamin J. Smith, Moore, SC (US);
 Michael J. Sette, Greer, SC (US);
 Roland S. Moore, Greer, SC (US)

(73) Assignee: Wabtec Holding Corp., Wilmerding, PA (US)

( * ) Notice: Subject to any disclaimer, the term of this patent is extended or adjusted under 35 U.S.C. 154(b) by 471 days.

(21) Appl. No.: 12/330,045

(22) Filed: Dec. 8, 2008

(65) Prior Publication Data
 US 2010/0139423 A1  Jun. 10, 2010

(51) Int. Cl.
 *B25B 27/14* (2006.01)

(52) U.S. Cl. .............. 29/235; 29/238; 29/272

(58) Field of Classification Search ........... 29/235, 29/238, 239, 255, 263, 272; 72/402
 See application file for complete search history.

(56) References Cited

U.S. PATENT DOCUMENTS

| | | | |
|---|---|---|---|
| 3,918,346 A | 11/1975 | Ziegler | |
| 4,050,554 A | 9/1977 | Scheffel | |
| 4,063,491 A | 12/1977 | Roger et al. | |
| 4,116,113 A | 9/1978 | Leclerc | |
| 4,138,148 A | 2/1979 | Zaremba | |
| 4,280,398 A | 7/1981 | Kerscher et al. | |
| 4,552,056 A | 11/1985 | McKay | |
| 4,564,088 A | 1/1986 | Takahashi et al. | |
| 4,777,867 A | 10/1988 | Severinsson et al. | |
| 4,811,651 A * | 3/1989 | Hata et al. ............. | 92/29 |
| 4,865,166 A | 9/1989 | Rocholl et al. | |
| 4,874,065 A | 10/1989 | Engle | |
| 4,907,491 A | 3/1990 | Filip | |
| 4,957,193 A | 9/1990 | Tamamori | |
| 4,989,443 A * | 2/1991 | Sawdon ............. | 72/402 |
| 5,423,401 A | 6/1995 | Noah et al. | |
| 5,558,411 A | 9/1996 | Kanjo et al. | |
| 5,564,795 A | 10/1996 | Engle | |
| 5,636,562 A | 6/1997 | Choinski et al. | |
| 5,640,893 A | 6/1997 | Stojic | |
| 5,816,371 A | 10/1998 | Buckley et al. | |
| 5,848,550 A * | 12/1998 | Cathcart et al. .......... | 74/2 |
| 5,890,270 A * | 4/1999 | Oetiker ............. | 29/235 |
| 5,937,974 A | 8/1999 | Cathcart et al. | |
| 6,006,651 A | 12/1999 | Pierce et al. | |
| 6,186,284 B1 | 2/2001 | Sauter et al. | |
| 6,363,811 B1 | 4/2002 | Saldana | |
| 6,378,668 B1 | 4/2002 | Zemyan et al. | |
| 6,397,986 B2 | 6/2002 | Moore | |
| 6,491,141 B1 | 12/2002 | Severinsson | |
| 6,698,552 B2 | 3/2004 | Huber, Jr. et al. | |
| 6,725,975 B2 | 4/2004 | Chapman | |
| 6,799,502 B2 | 10/2004 | Wolfsteiner et al. | |
| 6,802,398 B2 | 10/2004 | Drennen et al. | |
| 6,854,570 B2 | 2/2005 | Connell | |
| 7,097,011 B2 | 8/2006 | Severinsson | |
| 7,108,108 B1 | 9/2006 | Heinzeroth | |
| 7,140,477 B2 | 11/2006 | Engle et al. | |

(Continued)

*Primary Examiner* — Lee D Wilson
(74) *Attorney, Agent, or Firm* — The Webb Law Firm

(57) ABSTRACT

A clamp and quick release mechanism for clamping and releasing a cylindrical linkage to a rod-like member comprises a locking ring located on the rod-like member and a clamping ring. The inner surface of the clamping ring and the outer surface of the locking ring are configured such that rotation of the clamping ring in one direction will compress the locking ring and rotation in the other direction will allow expansion of the locking ring.

3 Claims, 3 Drawing Sheets

U.S. PATENT DOCUMENTS

| | | |
|---|---|---|
| 2003/0024774 A1 | 2/2003 | Huber, Jr. et al. |
| 2005/0082126 A1* | 4/2005 | Engle et al. .................. 188/265 |
| 2005/0155827 A1 | 7/2005 | Huber, Jr. et al. |
| 2010/0139423 A1* | 6/2010 | Levins et al. ...................... 74/2 |

* cited by examiner

ROTARY MANUAL RELEASE

BACKGROUND OF THE INVENTION

1. Field of the Invention

The present invention relates generally to a clamp and quick release mechanism that is particularly suitable for releasing parking brakes for passenger train applications.

2. Description of Related Art

Cathcart et al. U.S. Pat. No. 5,937,974 entitled "Spring Applied Parking Brake Actuator Having a Collet Style Slack Adjuster" discloses a parking brake piston combined with a service brake piston in one compact actuator unit. The parking brake function in the Cathart et al. patent uses a spring-applied, air release-style parking brake. In the absence of air pressure, the parking brake spring provides the braking force. Other designs for spring-applied parking brake of this type are known. Once a railcar is disconnected from the train and a source of compressed air provided by the brake line is removed, the parking brake is automatically applied. It is sometimes necessary to remove the spring-applied brake when no source of compressed air is available. Typically, a manual release is provided which disconnects a brake driving linkage from the spring. When air pressure is available again, the release is automatically reset. A manual release of this type is disclosed in Cathcart et al. U.S. Pat. No. 5,848,550 entitled "Parking Brake Manual Release Mechanism." This application is directed to a manual release useful for such applications.

SUMMARY OF THE INVENTION

Briefly, according to one embodiment of this invention, there is provided a clamp and quick release mechanism for clamping and releasing a cylindrical linkage on a rod-like member. The cylindrical linkage is provided with an internal circumferential groove on an inner surface and the rod-like member is provided with an external circumferential groove on the exterior surface facing said internal circumferential groove.

A locking ring is located on the rod-like member and is sized to seat in the internal groove or to bridge the internal and external grooves. The locking ring is split. The locking ring also has a radial anchoring extension received in a slot in cylindrical linkage, thus preventing rotation of the locking ring. A clamping ring is positioned in the internal circumferential groove and is concentric with the locking ring. The clamping ring has a gap opposite the recess such that limited rotation of the clamping ring does not interfere with the anchoring extension of the locking ring. The inner surface of the clamping ring and the outer surface of the locking ring are configured such that rotation of the clamping ring in one direction will compress the locking ring and rotation in the other direction will allow expansion of the locking ring. A reciprocating release mechanism causes rotation of the clamping ring between clamping and unclamping positions.

Briefly, according to a preferred embodiment of this invention, there is provided a clamp and quick release mechanism for clamping and releasing a cylindrical linkage on a rod-like member. The cylindrical linkage is provided with an internal circumferential groove on an inner surface and the rod-like member is provided with an external circumferential groove on the exterior surface facing the internal circumferential groove.

A locking ring is located on the rod-like member and sized to seat in the internal circumferential groove or to bridge the internal and external grooves. The locking ring is split and has radially extending tabs adjacent the split. The locking ring also has a radial anchoring extension generally opposite the split for being received in a slot in cylindrical linkage, thus preventing rotation of the locking ring. The locking ring has radial compression tabs between the anchoring extension and the split. A clamping ring is positioned in the internal circumferential groove and is concentric with the locking ring. The clamping ring has a first recess on an inner surface for receiving the tabs on the locking ring adjacent the split when the clamping ring is rotated to align with the split-ends. Second and third recesses on inner surfaces of the clamping ring align with the compression tabs. The clamping ring has a gap opposite the recess such that limited rotation of the clamping ring does not interfere with the anchoring extension of the locking ring. The tabs on the locking ring and recesses on the clamping ring are arranged so that on rotation of the clamping ring, the tabs are out of alignment with the recesses causing radially inward compression of the locking ring.

A release mechanism causes rotation of the clamping ring between clamping and unclamping positions. The release mechanism comprises a driving tab extending radially outward from the clamping ring and a drawbar sliding within a bore in the cylindrical linkage pivotally attached at one end to the driving tab, whereby reciprocation of the drawbar rotates the clamping ring within the internal circumferential groove. The drawbar is spring biased to rotate the clamping ring in the clamping position when the internal and external grooves realign.

BRIEF DESCRIPTION OF THE DRAWINGS

Further features and other objects and advantages are explained with reference to the drawings in which.

DESCRIPTION OF THE PREFERRED EMBODIMENTS

Figure 1:
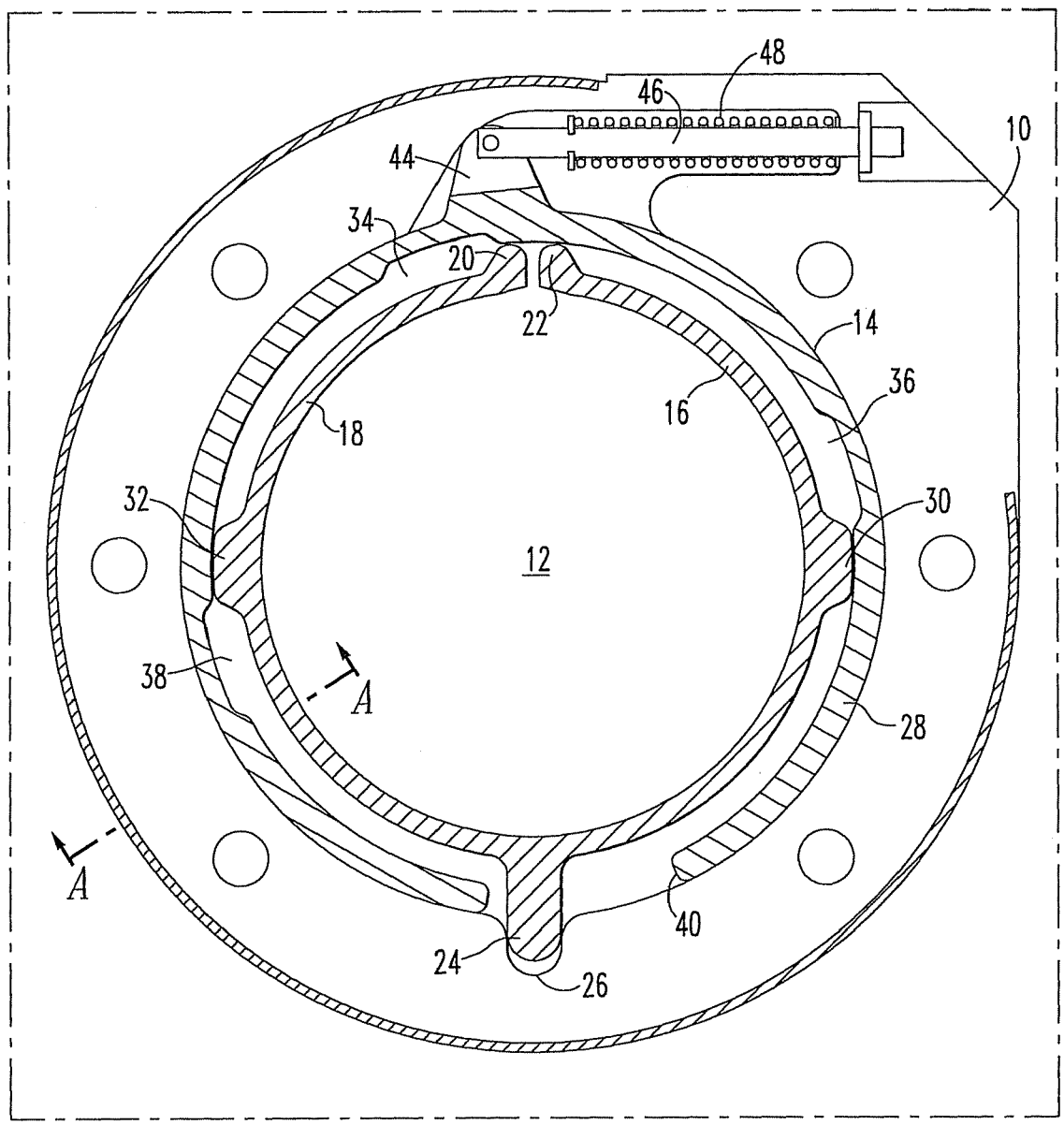
FIG. 1 is a section view of a clamp and rotary release mechanism, according to one embodiment of this invention, in the closed/locked position.
Figure 2:
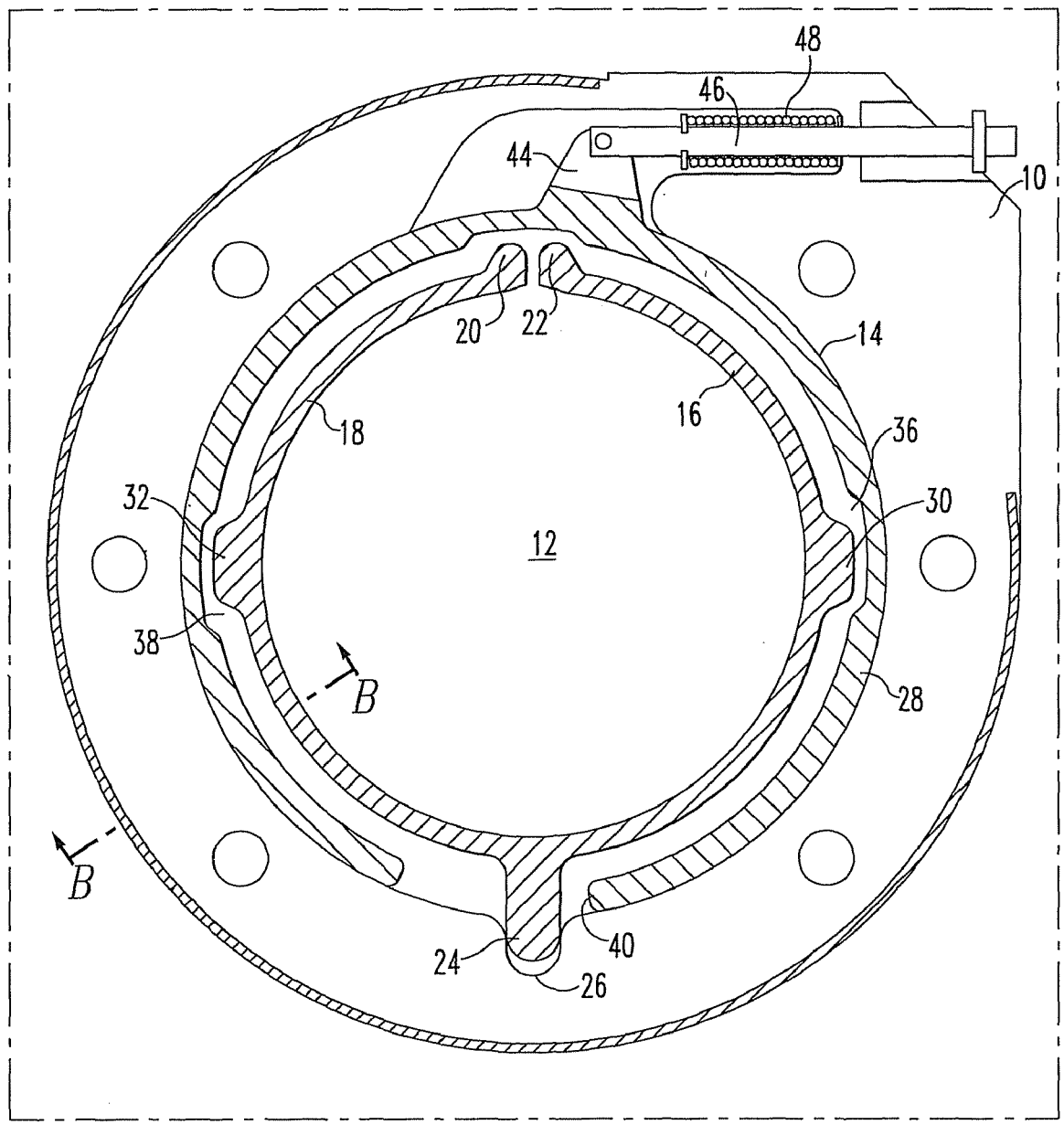
FIG. 2 is a section view of a clamp and rotary release mechanism, according to one embodiment of this invention, in the open unlocked position.

Referring now to FIGS. 1 and 2, a clamp and quick release mechanism for clamping a cylindrical linkage 10 to a rod-like member 12 is illustrated. The cylindrical linkage may be biased by a parking brake spring to apply the parking brake, such as sleeve 21 illustrated in Cathcart et al. U.S. Pat. No. 5,937,974. The rod-like member 12 may be connected to the brake rigging for application of the brake shoes, such as intermediate sleeve 42 illustrated in the Cathcart et al. patent. When the rod-like member 12 is released from the cylindrical linkage, relative axial motion is permitted. In the case of the Cathcart et al. patent, relative axial movement of the sleeve 21 and intermediate sleeve 42 allows the brake shoes to back off.

Figure 3:
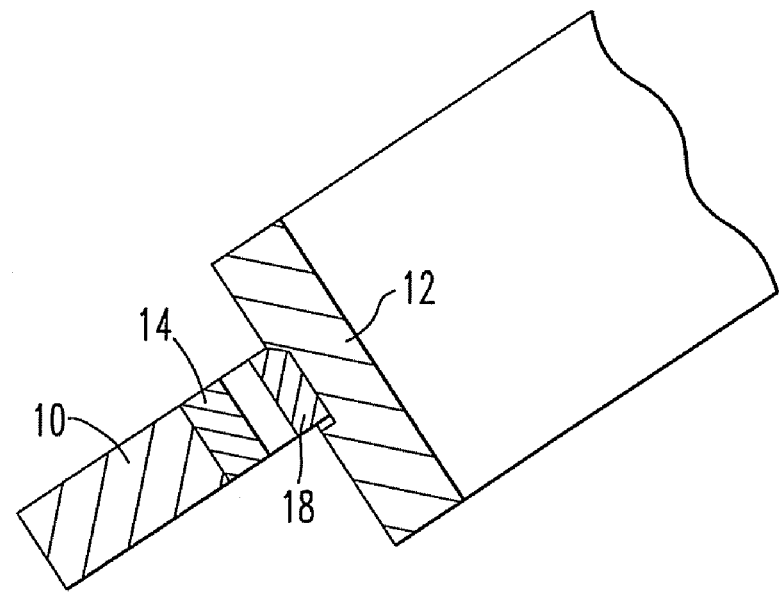
FIG. 3 is a section view along line A-A in FIG. 1.
Figure 4:
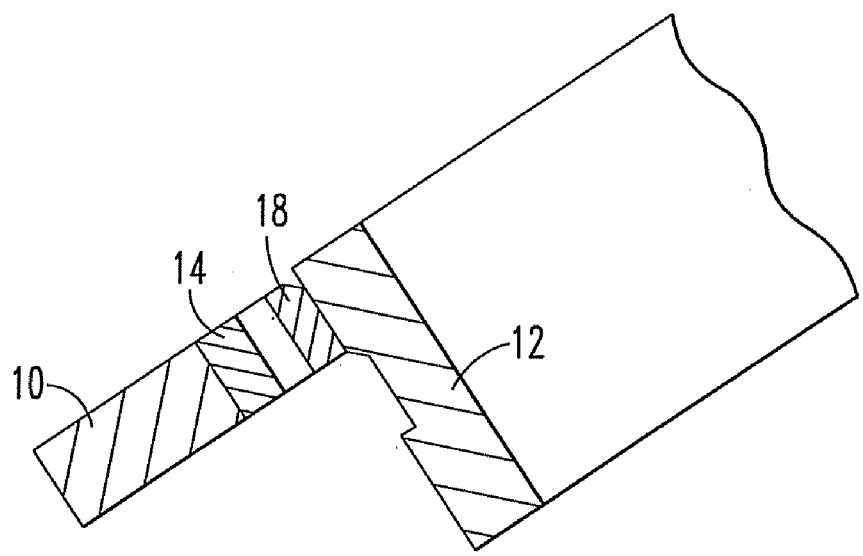
FIG. 4 is a section view taken along line B-B in FIG. 2.

The cylindrical linkage 10 is provided with an internal circumferential groove 14 on an inner surface and the rod-like member 12 is provided with an external circumferential groove 16 on the exterior surface facing the internal circumferential groove. When the cylindrical linkage and rod-like member are clamped together, the two grooves are aligned. After unclamping, the grooves will no longer necessarily be aligned. The grooves are annular and will typically have a partially rectangular cross section as shown in FIGS. 3 and 4.

A locking ring 18 is located adjacent the rod-like member 12 and is sized to seat in the internal circumferential groove 14 or to bridge the internal and external grooves. The locking ring 18 is split and has radially extending tabs 20, 22 adjacent the split. The locking ring 18 also has a radial anchoring extension 24 generally opposite the split for being received in a slot 26 in cylindrical linkage, thus preventing rotation of the locking ring. The locking ring has radial compression tabs 30, 32 between the anchoring extension and the split.

A clamping ring 28 is positioned in the internal circumferential groove 14 and is concentric with the locking ring 18. The clamping ring 28 has a first recess 34 on an inner surface for receiving the tabs 20, 22 on the locking ring 18 adjacent the split when the clamping ring is rotated to align with the split end and the clamping is released. Second recess 36 and third recess 38 on inner surfaces align with the compression tabs 30, 32, respectively, when clamping is released. The clamping ring has a gap 40 opposite the recess such that limited rotation of the clamping ring does not interfere with the anchoring extension of the locking ring. The tabs on the locking ring and recesses on the clamping ring are arranged so that on rotation of the clamping ring, the tabs are out of alignment with the recesses causing radially inward compression of the locking ring.

A release mechanism 42 causes rotation of the clamping ring 28 between clamping and unclamping positions. The release mechanism comprises a driving tab 44 extending radially outward from the clamping ring and a drawbar 46 sliding within a bore in the cylindrical linkage pivotally attached at one end to the driving tab, whereby reciprocation of the drawbar rotates the clamping ring within the internal circumferential groove 14. The drawbar is biased by a spring 48 to rotate the clamping ring in the clamping position when the internal and external grooves realign.

Referring to FIG. 2, release is effected by pulling the drawbar 46 to the right as seen in the figure which will rotate the clamping ring clockwise as seen in the figure, thus moving the recesses 34, 36, and 38 into alignment with tabs 20, 22, 30, 32. This allows the locking ring to radially expand away from the external groove 16 on the rod-like member.

Referring to FIG. 1, when the internal and external grooves are again aligned, the spring 48 moves the drawbar 46 to the left as seen in the figure and rotates the clamping ring counterclockwise as seen in the figure. This causes the tabs 30, 32 to push the locking ring 18 into the external groove. The locking ring then bridges the internal and external grooves preventing relative axial movement of the cylindrical linkage and the rod-like member.

The external and internal grooves have a partially rectangular cross section with a common axial width. The locking ring and clamping rings also have partially rectangular cross sections and with an axial width somewhat smaller than the axial width of the grooves.

Having thus described our invention with the detail and particularity required by the Patent Laws, what is desired protected by Letters Patent is set forth in the following claims.

The invention claimed is:

1. A clamp and quick release mechanism for clamping and releasing a cylindrical linkage to a cylindrical member comprising:
   said cylindrical linkage having an internal circumferential groove provided in an inner surface of the cylindrical linkage;
   said cylindrical member having an external circumferential groove provided on the exterior surface of said cylindrical member facing said internal circumferential groove during clamping;
   a locking ring located on said cylindrical member and sized to fit in said internal circumferential groove or to bridge the internal and external grooves, said locking ring being split, said locking ring having a radial anchoring extension received in a slot in said cylindrical linkage for preventing rotation of said locking ring;
   a clamping ring positioned in said internal circumferential groove and being concentric with said locking ring and said cylindrical member, said clamping ring having a gap opposite said recess such that limited rotation of said clamping ring does not interfere with said anchoring extension of said locking ring;
   the inner surface of said clamping ring and the outer surface of said locking ring configured such that rotation of the clamping ring in one direction will compress the locking ring and rotation in the other direction will allow expansion of the locking ring; and
   means for causing rotation of said clamping ring between clamping and unclamping positions.

2. A clamp and quick release mechanism for clamping and releasing a cylindrical linkage to a cylindrical member comprising:
   said cylindrical linkage having an internal circumferential groove provided in an inner surface of the cylindrical linkage;
   said cylindrical member having an external circumferential groove provided on the exterior surface of said cylindrical member facing said internal circumferential groove during clamping;
   a locking ring located on said cylindrical member and sized to fit in said internal circumferential groove or to bridge the internal and external grooves, said locking ring being split and having radially extending tabs adjacent the split, said locking ring having a radial anchoring extension generally opposite said split received in a slot in said cylindrical linkage for preventing rotation of said locking ring, said locking ring having radial compression tabs between the anchoring extension and the split;
   a clamping ring positioned in said internal circumferential groove and being concentric with said locking ring and said cylindrical member and having a first recess on an inner surface for receiving the tabs on the locking ring adjacent the split when the clamping ring is rotated to align with said split end and second and third recesses on inner surfaces that align with said compression tabs, said clamping ring having a gap opposite said recess such that limited rotation of said clamping ring does not interfere with said anchoring extension of said locking ring;
   said tabs on said locking ring and recesses on said clamping ring being arranged so that on rotation of the clamping ring the tabs are out of alignment with said recesses causing radially inward compression of the locking ring; and
   means for causing rotation of said clamping ring between clamping and unclamping positions comprising a driving tab extending radially outward from said clamping ring, and a drawbar sliding within a bore in said cylindrical linkage pivotally attached at one end to said driving tab whereby reciprocation of said drawbar rotates the clamping ring.

3. The quick release mechanism according to claim 2, further comprising a spring to bias the drawbar to rotate the clamping ring in the clamping position.

* * * * *